United States Patent
Armstrong

(10) Patent No.: US 6,880,880 B1
(45) Date of Patent: Apr. 19, 2005

(54) TAKE-OFF TRAILER

(76) Inventor: Lonnie D. Armstrong, 20500 State Hwy. 28, Glenwood, Pope, MN (US) 56334

(*) Notice: Subject to any disclaimer, the term of this patent is extended or adjusted under 35 U.S.C. 154(b) by 62 days.

(21) Appl. No.: 10/391,522

(22) Filed: Mar. 17, 2003

Related U.S. Application Data

(60) Provisional application No. 60/365,073, filed on Mar. 15, 2002.

(51) Int. Cl.[7] .............................................. B62D 33/00
(52) U.S. Cl. .................... 296/183.1; 296/169; D12/102
(58) Field of Search ........................... 296/183.1, 37.6, 296/100.06, 98, 168, 182, 37.16, 37.1, 182.1, 296/100.07, 169, 24.44, 173, 184.1; 280/20, 280/124.77, 416.1, 639; 224/485, 524, 525, 224/527, 404, 54, 413; 105/404; D12/102

(56) References Cited

U.S. PATENT DOCUMENTS

| | | | |
|---|---|---|---|
| D240,806 S * | 8/1976 | Hawes ...................... D12/102 |
| 4,057,283 A * | 11/1977 | Barnett ........................ 296/173 |
| 4,180,881 A * | 1/1980 | Speranza ..................... 114/344 |
| 4,196,918 A * | 4/1980 | Strader ..................... 280/478.1 |
| 4,239,258 A * | 12/1980 | Burris ......................... 280/639 |
| 4,387,835 A | 6/1983 | Golzer |
| 4,426,097 A * | 1/1984 | Livingston ............... 280/416.1 |
| 4,469,256 A * | 9/1984 | McEwen ..................... 224/413 |
| 4,566,717 A * | 1/1986 | Arthur et al. ............... 280/788 |
| 4,848,316 A * | 7/1989 | Beller ......................... 126/276 |
| 5,011,170 A | 4/1991 | Forbes et al. |
| 5,231,393 A * | 7/1993 | Strickland ................... 340/936 |
| D373,100 S * | 8/1996 | Carter ....................... D12/102 |
| D378,583 S * | 3/1997 | Aitken, III ................. D12/102 |
| 5,653,494 A * | 8/1997 | Cleall et al. ............. 296/181.3 |
| 5,855,309 A | 1/1999 | Hallsworth |
| 5,906,470 A * | 5/1999 | Desjardins ............... 296/184.1 |
| 6,053,563 A * | 4/2000 | Edgeller et al. ......... 296/181.2 |
| 6,283,537 B1 | 9/2001 | Devore, III |
| 6,296,297 B1 * | 10/2001 | Barrow et al. .............. 296/169 |
| 6,422,641 B1 * | 7/2002 | Coryell ..................... 296/182.1 |
| 6,457,764 B1 * | 10/2002 | Brannon ................... 296/24.44 |
| 6,739,617 B1 * | 5/2004 | Martin ....................... 296/169 |

\* cited by examiner

Primary Examiner—Kiran Patel
(74) Attorney, Agent, or Firm—Albert W. Watkins

(57) ABSTRACT

An aesthetically pleasing trailer incorporates stock motorcycle side bags into the trailer, surrounding a central cargo box. The central compartment is designed in a generally parallelepiped shape, and has a leading surface which leads the side bags through an airstream when said trailer is traveling forward. The central cargo box may include a cover resembling a motorcycle seat, and will preferably have a locking closure for securing the cargo area. Most preferably, release mechanisms under the cover open access to the side bags. Consequently, access to the side bags is controlled through a single closure lock. The trailer may also be supported upon a torsion axle.

4 Claims, 6 Drawing Sheets

TAKE-OFF TRAILER

CROSS REFERENCE TO RELATED APPLICATIONS

This application claims priority to U.S. provisional patent application Ser. No. 60/365,073 filed Mar. 15, 2002 and co-pending herewith.

BACKGROUND OF THE INVENTION

1. Field of the Invention

This invention pertains generally to land vehicle bodies and tops, and more specifically to trailer bodies. In one specific manifestation of the invention, a motorcycle trailer body is manufactured from stock motorcycle side bags and a central molded compartment.

2. Description of the Related Art

Throughout the ages, man has journeyed about the earth. During the course of a trip, many supplies, accessories, cargo or the like are typically required. The transport of this cargo has always presented somewhat of a dilemma. As man must transport himself, and since the cargo is rarely conducive to transport upon his person, and is frequently uncomfortable or undesirable to be pressed against, some other means must be provided for transport.

In the early days, this transport was achieved primarily by the carrying upon a beast. The cargo beast may have trailed behind or alongside the man, who may himself have been transported upon a beast. With the advent of reliable wheeled transports, wagons and the like became a mainstay for the carrying of cargo. These wagons would frequently have a forward section or seating for persons, and a rear portion for the holding of cargo. This has evolved into the modern day trailers, automobiles, vans, and trucks, the latter three which also contain an engine and therefore no longer depend upon the temperaments of the beast for motive force. One exemplary trailer is illustrated by De Vore in U.S. Pat. No. 6,283,537, which has a canopy resembling the much older covered wagons. These transportation vehicles in geometry have by and large been evolutionary from the early wagons in basic structure and function.

Motorcycles, on the other hand, tended to resemble a horse much more than a wagon, and are still today sometimes referred to as a "steel horse". Significant in this correlation is the fact that a motorcycle has several attributes that are very different from the standard automobile, truck or van. Most particularly, there is very little room for cargo. Side bags, which resemble the saddle bags used with horses, are sometimes provided to permit the rider to carry a limited amount of cargo. When this cargo capacity is filled, there is little option. Unlike the older days of horses, it is not possible or legal to run a second motorcycle behind the first to carry cargo without a rider. Instead a trailer must be provided.

For the purposes of this disclosure, a motorcycle will not be limited in meaning to two-wheeled motorized vehicles, and three wheeled vehicles often referred to as trikes will also be encompassed herein. Further, other small vehicles which are generally open and not otherwise enclosed, such as all-terrain vehicles and the like will be recognized as having the characteristics that are consequential to the nature of the present invention and to which the present invention will have application.

The trailer for use with a motorcycle will most desirably have several unique characteristics. The first is that of streamlining. It is not desirable to place a large aerodynamic drag behind the motorcycle, both for reasons of performance and economy, and also for aesthetic reasons. Consequently, the trailer should have a profile that will resemble that of the motorcycle to at least a reasonable degree. Another important factor is the accessibility of the cargo. Weather conditions may not always be accurately predicted in advance, as we all realize, and conditions such as precipitation may spoil access to the cargo area. This can be particularly troublesome when the desired cargo is, for example, nothing more than a rain suit, while there is other cargo that is sensitive to precipitation, such as important papers or the like.

Several patents are exemplary of prior art trailers, including U.S. Pat. Nos. 5,011,170 to Forbes et al; Des 240,806 to Hawes et al; Des 373,100 to Carter; and Des 378,583 to Aitken. These patents illustrate various designs, geometries and styles of trailers in the industry. Nevertheless, they each exhibit a single access cover, and offer only limited aesthetic resemblance to a motorcycle. Consequently, there is still a need for an improved trailer such as may be used behind a motorcycle.

SUMMARY OF THE INVENTION

In a first manifestation, the invention is a trailer body operatively coupled to a towing coupler, running gear, and a body. The trailer body has a first compartment, at least one compartment adjacent the first compartment, a moveable closure covering the adjacent compartment, a moveable closure covering the first compartment, and a release for the adjacent compartment moveable closure that is enclosed and inaccessible when the first compartment moveable closure is closed. A lock secures the first compartment moveable closure in a closed position.

In a second manifestation, the invention is a method of manufacturing a trailer. According to the method, stock compartments manufactured for a different land vehicle are obtained. A central compartment is formed having features for engaging the stock compartments. The central compartment is mounted upon running gear which are attached to a trailer tongue, and the stock compartments are engaged about the central compartment.

In a third manifestation, the invention is a trailer configured for articulated movement adjacent a tow vehicle which travels in a generally forward direction when being pulled. The trailer has an under-carriage having a trailer tongue, frame, suspension and running gear. A cargo box has a generally parallelepiped geometry extending longitudinally parallel to the trailer tongue, a leading surface most nearly adjacent the tow vehicle, and a trailing surface longitudinally distal thereto. The cargo box is accessible from on a top side. A first side bag of generally parallelepiped geometry longitudinally shorter than the cargo box is placed laterally adjacent thereto. A leading surface of the side bag is displaced longitudinally rearward of the leading surface of the cargo box to effect an aerodynamic streamlining when said trailer is traveling in the generally forward direction. A second side bag of generally parallelepiped geometry longitudinally shorter than the cargo box is placed laterally adjacent thereto and opposed to the first side bag. The second side bag has a leading surface which is displaced longitudinally rearward of the leading surface of the cargo box to effect an aerodynamic streamlining therebetween when the trailer is traveling in the generally forward direction. A release for at least one of the first and second side bags is adjacent the cargo box and actuated to open at least one of the first and second side bags. A top cover has a generally rectangular leading member extending a lateral distance comparable to the cargo box and covers a forward portion of the cargo box top side when closed thereupon. The top cover also has a trailing member extending a lateral distance greater than the cargo box which covers the release when the top cover is closed upon the cargo box. A lock retains the top cover in closed position upon the cargo box.

OBJECTS OF THE INVENTION

Exemplary embodiments of the present invention solve inadequacies of the prior art by providing a central formed compartment suitable for supporting stock side bags found on commercially available motorcycles. The central formed compartment may include a cover resembling a motorcycle seat, and will preferably have a lock for securing the closure. Most preferably, under the cover release mechanisms permit access to the side bags. Since the release mechanisms are only accessible under the cover, access to the side bags is controlled through a single closure lock. The central formed compartment is further designed for aerodynamic efficiency and aesthetic appearance, to resemble the back of a motorcycle.

A first object of the invention is to provide a well-streamlined trailer for use in association with a motorcycle or the like. A second object of the invention is to design that trailer to aesthetically resemble the back of a motorcycle or trike and thereby not disturb the aesthetic appearance. Another object of the present invention is to provide controlled access to the cargo using a single lock while still providing several compartments for the organized storage of cargo. A further object of the invention is to provide access while restricting precipitation to the single compartment being accessed, regardless of which compartment that may be. Yet another object of the present invention is to minimize the components which must be tooled for and produced, while incorporating stock components into the design. An additional object of the invention is the provision of a more stable suspension system, which reduces disruption of the cargo and towing vehicle.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
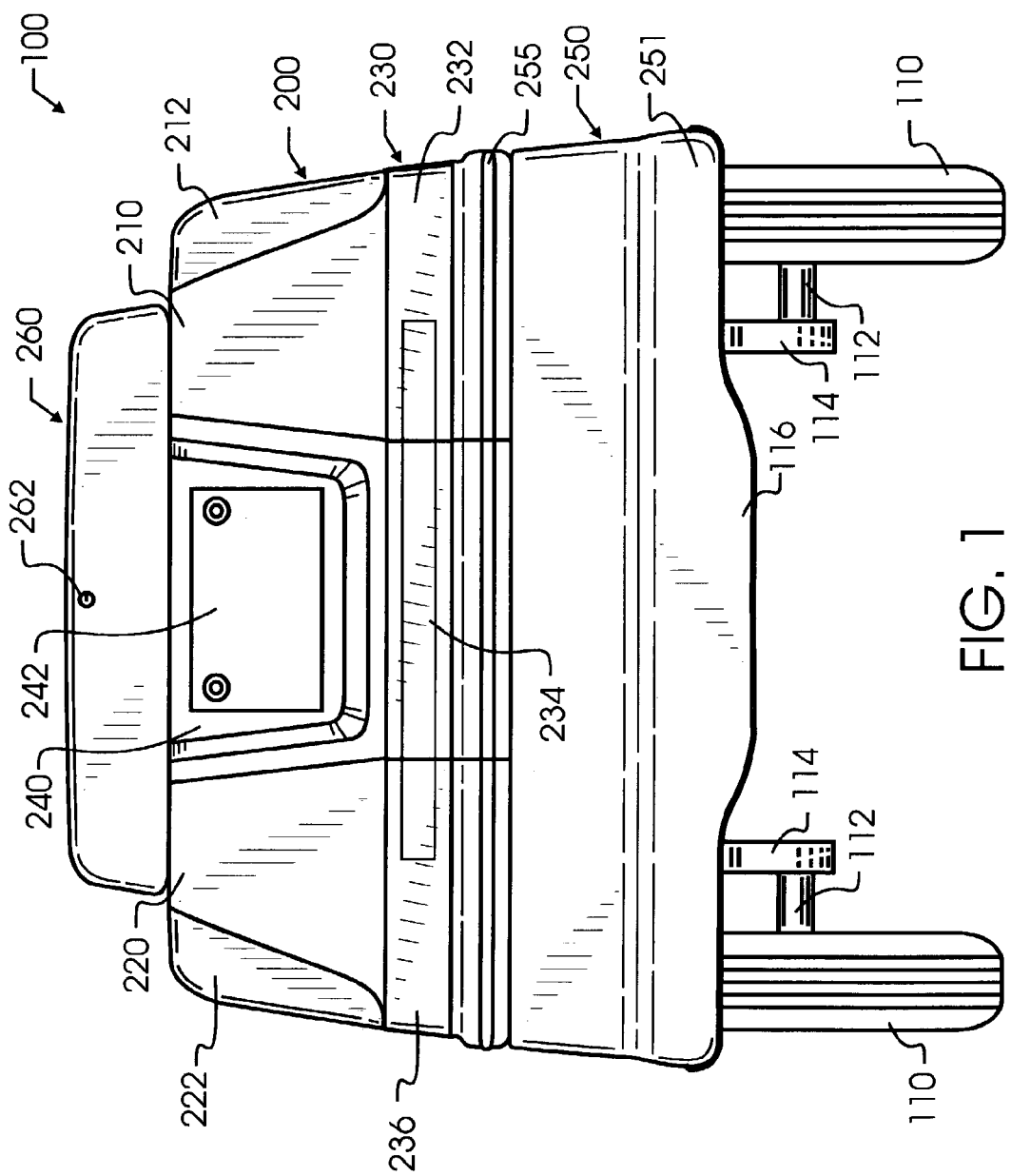
FIG. 1 illustrates a preferred embodiment of the invention from a rear elevation view.

Manifested in the preferred embodiment, the present invention provides an aesthetically pleasing trailer which directly incorporates stock side bags into the trailer. In addition, access to the side bags and a central compartment are all controlled by a single lock, thereby minimizing the need for separate locks or various keys.

In a most preferred embodiment of the invention illustrated in the figures, take-off trailer 100 comprises a trailer tongue 118 having the usual mechanisms for attachment to a ball or the like, the exact method of attachment to the towing vehicle not being critical to the present invention. At least one wheel 110, two as pictured, provide rolling support for trailer 100 over a roadway or other path. Wheels 110 are supported upon stub axles 112, which are retained upon torsion arms 114. The use of a torsion axle mounting provides superior load balance when obstacles such as pot holes and bumps are encountered, thereby reducing the likelihood that cargo will be damaged or disorganized, and also reducing the likelihood that trailer 100 will exert undesirable forces upon the towing vehicle. Trailer body 200 is carried upon an undercarriage or frame 116, to which a tongue 118 is attached.

Trailer body 200 preferably further includes at least three separate compartments for storing and transporting cargo. Two smaller outside compartments 210, 220 are most preferably taken directly from a stock vehicle, a motorcycle equipped with "saddle bag" style compartments being one example. In the illustrated embodiment, compartments 210, 220 are from a Honda Goldwing, though the brand and style of vehicle from which the bags are taken is not critical to the working of the invention. The rear view, as illustrated in FIG. 1, is most preferably very similar to the back of the vehicle from which the compartments are taken, so in the present instance the rear is designed to resemble the back of a Goldwing. In the preferred embodiment, a single third compartment defined by molding 250 is provided between two stock compartments 210, 220, though more than one compartment may be provided. As may be appreciated from the figures, each of these compartments 210,220,250 are generally parallelepiped in geometric shape. Compartment 250 maybe open across the entire top surface as in the most preferred embodiment, or may be only partially open as appropriate for a given design.

Figure 2:
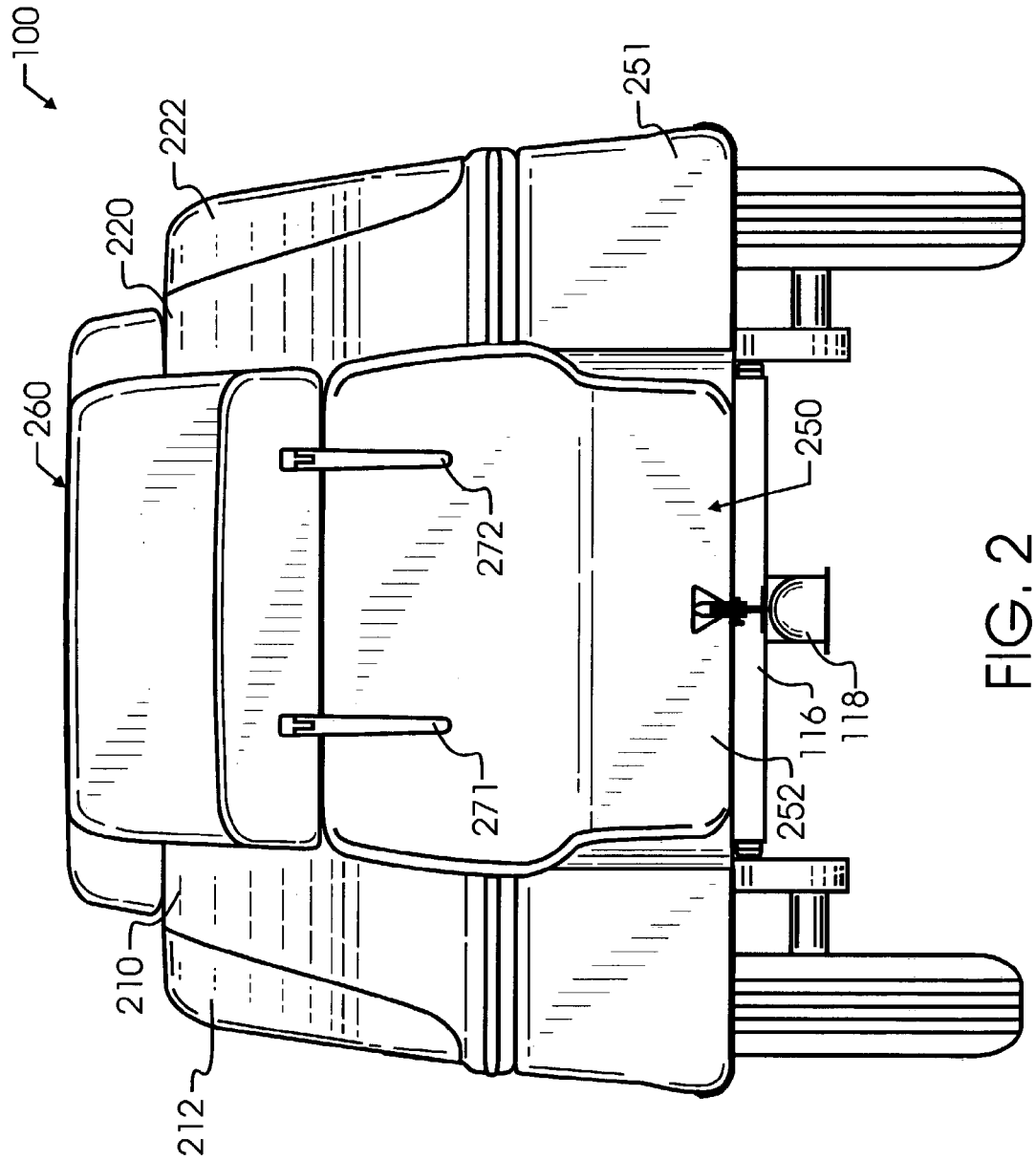
FIG. 2 illustrates the preferred embodiment of FIG. 1 from a front plan view.
Figure 4:
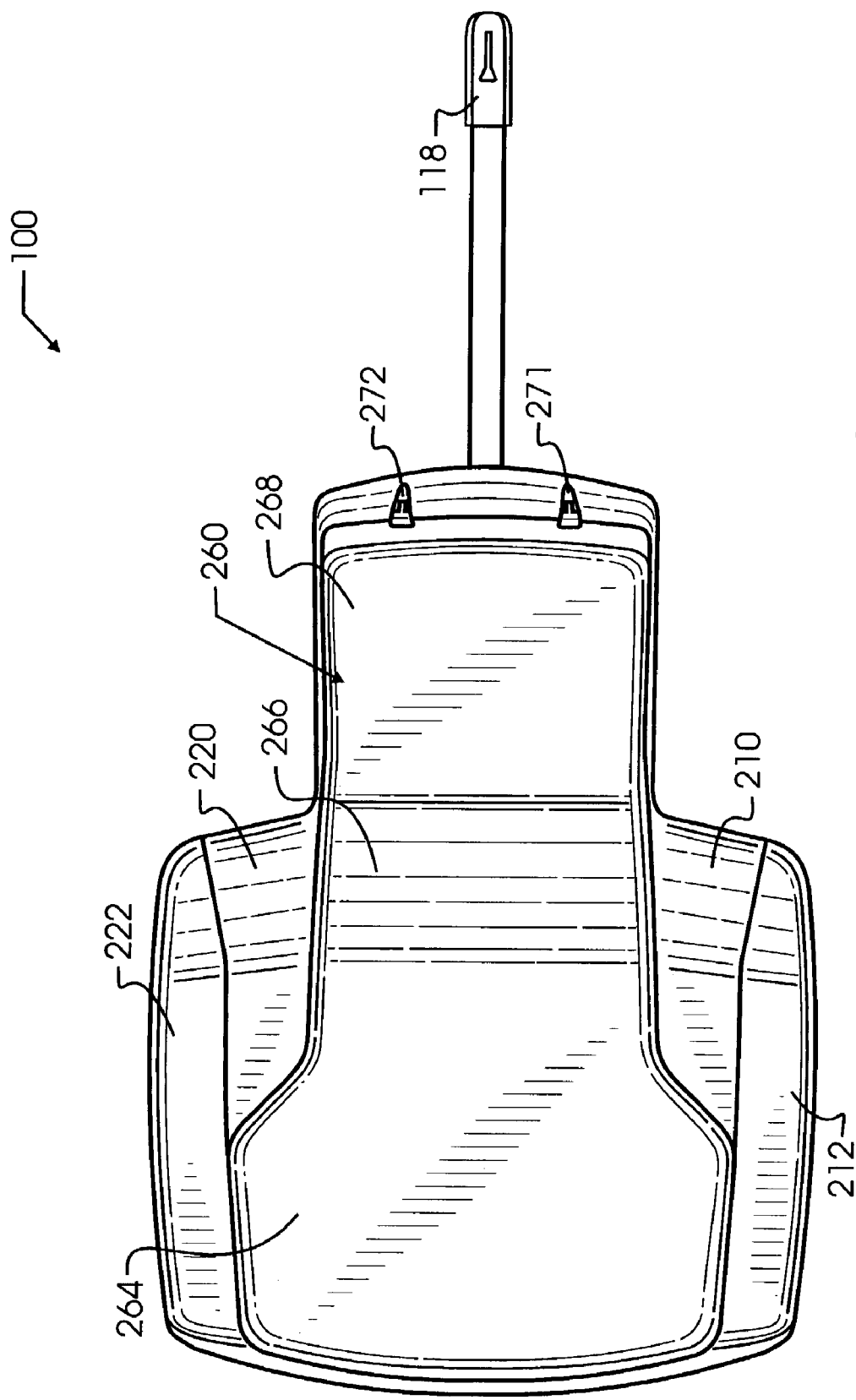
FIG. 4 illustrates the preferred embodiment of FIG. 1 from a top plan view.

As visible in the figures, center compartment 250 includes a cover 260, preferably having some type of lift assist, such as with springs, pneumatic lifters or the like as are known in the automotive and other industries, working in association with hinges 271,272 visible in FIGS. 2 and 4. Cover 260 will preferably engage with a seal, gasket, sealing surface or the like adjacent center compartment opening 256, visible in FIG. 5, to ensure that center compartment 250 is maintained sealed against the environment during use and storage. Additionally, center compartment opening 256 is elevated with respect to surrounding platform 216,which is also elevated with respect to side bags 210, 220, thereby forming a multi-level watershed. Additional gaskets, weatherstripping, weather and moisture barriers and the like may be provided. However, the present preferred embodiment has been proven effective as illustrated.

Figure 3:
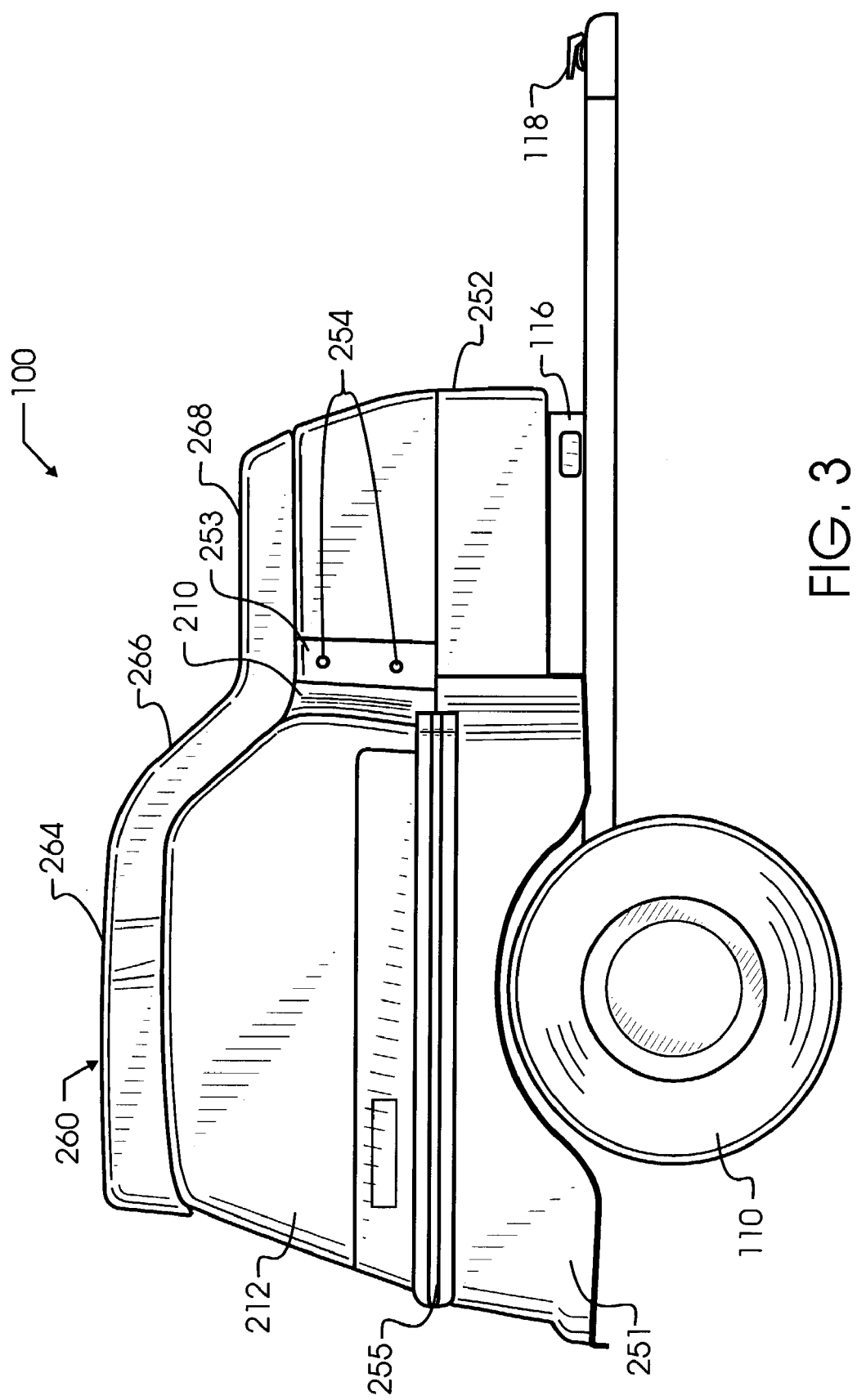
FIG. 3 illustrates the preferred embodiment of FIG. 1 from a right side plan view.

The geometry of each compartment is designed to optimize aerodynamic efficiency, while at the same time maintaining aesthetic appearance. As can be seen from FIG. 3, cover 260 has three members 264,266, and 268 which define different top elevations of compartment 250. Member 268, which is most forward and consequently most nearly adjacent to a towing vehicle, is preferably slightly shorter than the balance of cover 260, while member 266 provides a transition to the highest top member 264. This arrangement provides both aerodynamic efficiency, since the leading surface 252 of compartment 250 is smaller than the trailing surface of compartment 250, and also causes cover 260 to resemble a motorcycle seat, which provides valuable aesthetic appearance. Compartments 210,220 most preferably are set back from leading edge 252, which similarly provides improved aerodynamic behavior and also cooperates with the resemblance of cover 260 to a seat.

Cover 260 is secured in a closed position through a locking cylinder 262. While a locking cylinder is illustrated, those skilled in the art upon a reading of the present disclosure will recognize the myriad of fasteners that may be used. As but one example, it is contemplated herein to use a rotatable handle for latching cover 260 in place against the force of pneumatic lifters, the rotation of the handle which is either prevented or permitted by a locking cylinder such as cylinder 262.

Figure 5:
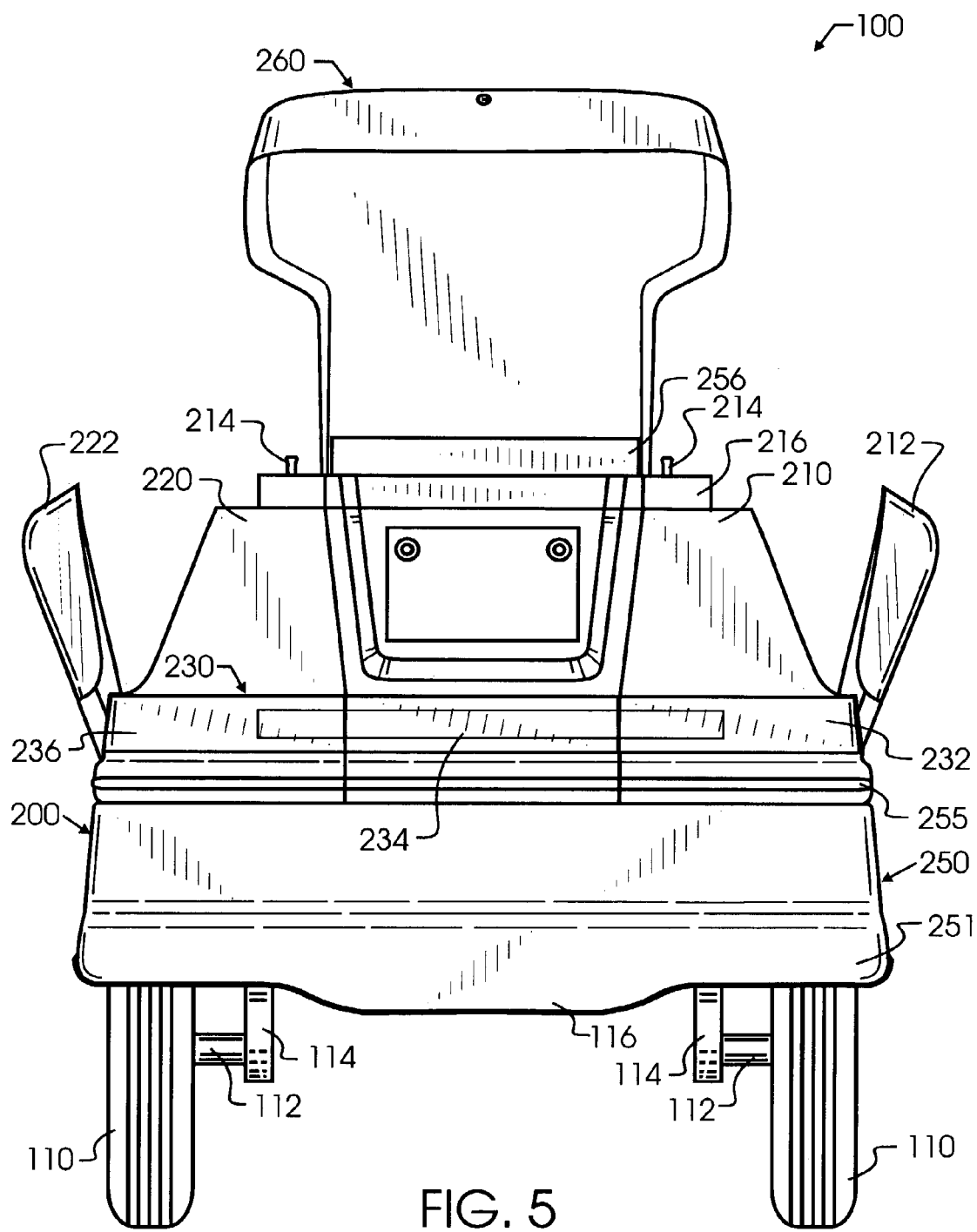
FIG. 5 illustrates the preferred embodiment of FIG. 1 from a rear elevation view with the moveable closures opened.
Figure 6:
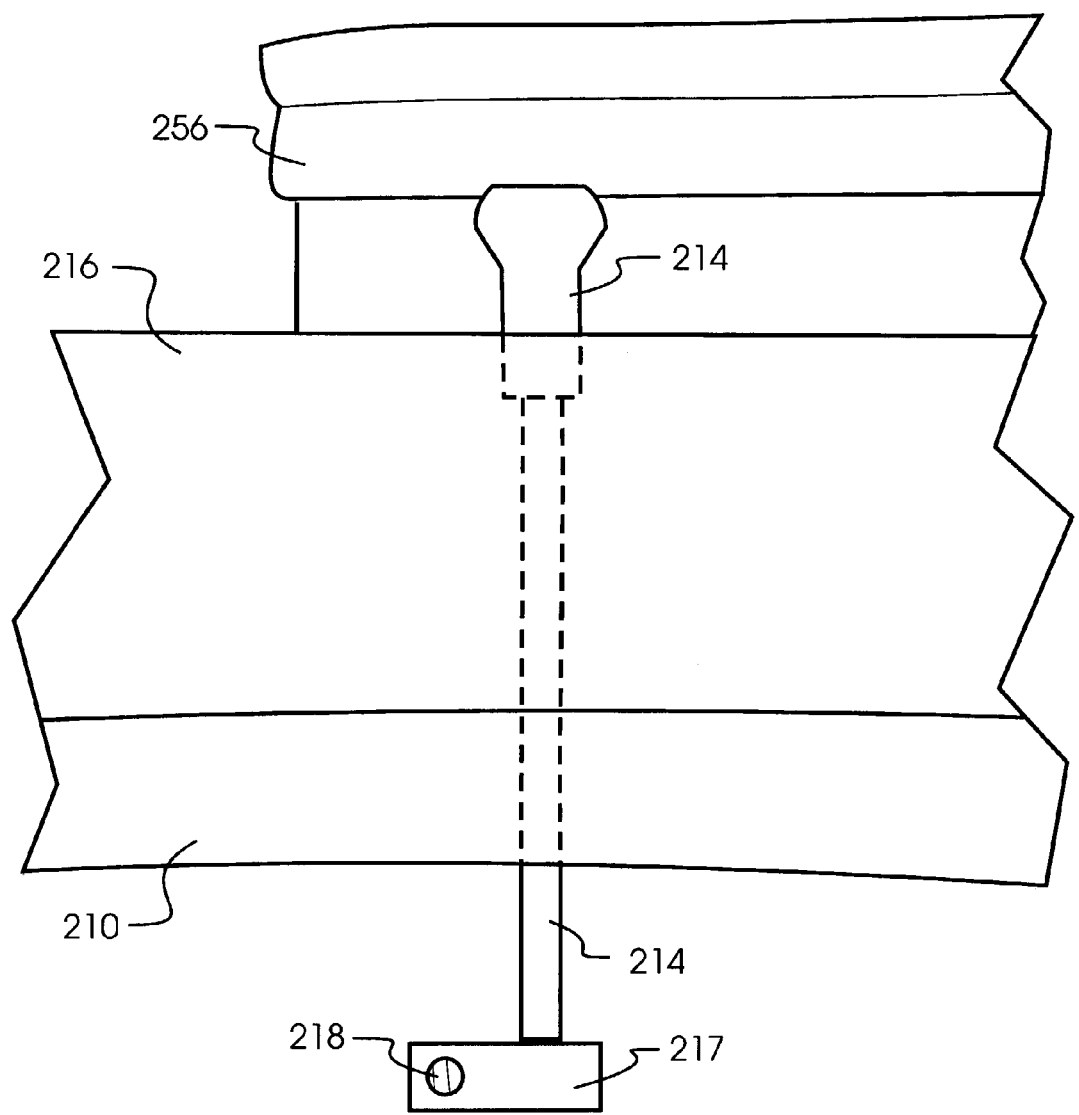
FIG. 6 illustrates the preferred embodiment of FIG. 1 from an enlarged close-up plan view showing the center section cover partially open, and the release pin and part of the mechanism used to release the visible side bag cover.

In addition, and as visible in FIGS. 5 and 6, it is most desirable to provide one or more release pins 214 which open side stock compartments 210, 220 by releasing a catch between compartment 210 and moving closure 212 and/or releasing a catch between compartment 220 and moving closure 222. The present invention encompasses providing one or more of these release mechanisms, whereby a single pin 214 may activate both side compartments 210, 220, or there will instead be an independent pin 214 for each compartment. Most preferably, the at least one pin 214 will be covered by center compartment cover 260 when center compartment cover 260 is closed, thereby preventing access thereto. Consequently, a single locking means 262 may be provided for center compartment cover 260 which prevents unauthorized access to any of the three compartments 210, 220, 250.

In the preferred embodiment illustrated in FIG. 6, pin 214 passes through platform 216 and the top surface of compartment 210 into engagement with a cam 217 extending from rotatable shaft 218. Downward force upon pin 214 causes rotatable shaft 218 to pivot, the motion which is used to disengage a catch within compartment 210 which otherwise retains moveable closure 212 closed. On the stock Goldwing compartments from the 1990's vintages, a rotatable rod is used as in the preferred embodiment, but is instead actuated by a cable rather than the illustrated pin 214. Consequently, the only revision necessary to the mechanism is the substitution of pin 214 activation shown in FIG. 6 for the previous cable actuation used on the Honda Goldwing.

The method of manufacturing trailer comprises the production of a running carriage, which in the most preferred embodiment includes trailer tongue 118, frame 116, torsion axle components 112, 114, wheel set 110, and associated components. A plastic, composite or the like is preferably molded to take the shape of central compartment 250, and most preferably is designed to directly receive stock compartments 210, 220. These are typically bolted directly to the central compartment 250, though the method of fastening and points of anchor will vary depending upon the manufacture of stock compartments 210, 220. Preferably, central compartment 250 may be formed integrally or unitarily with additional features designed to cooperate with stock compartments 210, 220 such as skirt 251. This skirt 251 is provided to enhance the visual appearance, but is not essential to the operation of trailer body 200. Similarly, trim strips 255 may be provided as optional decoration, or may come as a part of the stock compartments 210, 220, but these trimmings are also not essential to the operation of the present invention. Additional panels 253 are provided on each side of compartment 250 and include fasteners 254 for retaining stock compartments 210, 220 onto central compartment 250, though other types of stock compartments may or may not require these panels.

In order to be street legal, normal operating lights must be provided, which may be provided as a part of the stock compartments 210, 220 or may be separately provided. Light panel 230 includes sections 232, 234 and 236, which in the preferred embodiment is an integral part of stock compartments 210, 220. In the most preferred embodiment, a slightly recessed license plate holder 240 includes a license plate 242. Sections 240 and 234 combine with compartments 210,220 to form a major part of the trailing surface of trailer body 200, with skirt 251 and cover 260 forming the balance thereof. Release pins 214 may be provided as desired, and trailer 100 is then attached to a towing vehicle. As aforementioned, trailer 100 may be customized to have the same appearance as the rear view of the towing vehicle.

As may be apparent, a variety of designs have been contemplated for the present invention, and the invention is not limited to the most preferred version illustrated. In addition, the materials used for a particular design may be chosen not only based upon factors such as strength, weather resistance and weight, but may also factor in the particular design.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

I claim:

1. A trailer configured for articulated movement adjacent a tow vehicle and traveling in a generally forward direction when being pulled, comprising:
   an under-carriage having a trailer tongue, frame, suspension and running gear;
   a cargo box having a generally parallelepiped geometry extending longitudinally parallel to said trailer tongue, a leading surface most nearly adjacent said tow vehicle, and a trailing surface longitudinally distal thereto, said cargo box accessible from on a top side;
   a first side bag of generally parallelepiped geometry longitudinally shorter than said cargo box and placed laterally adjacent thereto, said first side bag having a leading surface which is displaced longitudinally rearward of said leading surface of said cargo box to effect an aerodynamic streamlining therebetween when said trailer is traveling in said generally forward direction;
   a second side bag of generally parallelepiped geometry longitudinally shorter than said cargo box and placed laterally adjacent thereto and opposed to said first side bag, said second side bag having a leading surface which is displaced longitudinally rearward of said leading surface of said cargo box to effect an aerodynamic streamlining therebetween when said trailer is traveling in said generally forward direction;
   a release for at least one of said first and second side bags adjacent said cargo box and actuated to open said at least one of said first and second side bags;

a top cover having a generally rectangular leading member extending a lateral distance comparable to said cargo box which covers a forward portion of said cargo box top side when closed thereupon, and a trailing member extending a lateral distance greater than said cargo box which covers said release when said top cover is closed upon said cargo box; and a lock retaining said top cover in said closed position upon said cargo box.

2. The trailer of claim 1 further comprising a trailing surface extending laterally from said first side bag to said second side bag and thereby structurally interconnecting said first and second side bags, said trailing surface having tail lights.

3. The trailer of claim 2 wherein said first and second side bags and said trailing surface are a single integral unit removed from a stock motorcycle.

4. The trailer of claim 1 wherein said cargo box front region under said top cover leading member has an elevation less than a balance of said cargo box, thereby providing a leading surface area reduced from a surface area of said cargo box trailing surface.

* * * * *